United States Patent
Yang

(10) Patent No.: US 11,977,783 B2
(45) Date of Patent: *May 7, 2024

(54) METHOD AND APPARATUS FOR PERFORMING DATA ACCESS CONTROL OF MEMORY DEVICE WITH AID OF PREDETERMINED COMMAND

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,449

(22) Filed: Jul. 14, 2022

(65) Prior Publication Data

US 2023/0133559 A1 May 4, 2023

Related U.S. Application Data

(60) Provisional application No. 63/273,121, filed on Oct. 28, 2021.

(51) Int. Cl.
*G06F 3/06* (2006.01)

(52) U.S. Cl.
CPC .......... *G06F 3/0659* (2013.01); *G06F 3/0607* (2013.01); *G06F 3/065* (2013.01); *G06F 3/0679* (2013.01)

(58) Field of Classification Search
CPC .... G06F 3/0659; G06F 3/0679; G06F 3/0607; G06F 3/065

See application file for complete search history.

(56) References Cited

U.S. PATENT DOCUMENTS

2014/0108752 A1* 4/2014 Brown .................... G06F 3/065
711/E12.103
2016/0261104 A1 9/2016 Bass
(Continued)

FOREIGN PATENT DOCUMENTS

CN 108780432 A 11/2018
CN 109815172 A 5/2019
(Continued)

OTHER PUBLICATIONS

Jason Evangelho, Intel And Micron Jointly Unveil Disruptive, Game-Changing 3D XPoint Memory, 1000x Faster Than NAND, Jul. 28, 2015, retrieved from https://hothardware.com/news/intel-and-micron-jointly-drop-disruptive-game-changing-3d-xpoint-cross-point-memory-1000x-faster-than-nand.
(Continued)

*Primary Examiner* — Mark A Giardino, Jr.
(74) *Attorney, Agent, or Firm* — Winston Hsu

(57) ABSTRACT

A method for performing data access control of a memory device with aid of a predetermined command and associated apparatus are provided. The method may include: utilizing the memory controller to receive a first single command from a host device through a transmission interface circuit of the memory controller; and in response to the first single command conforming to a predetermined format of the predetermined command, utilizing the memory controller to perform a series of operations according to the first single command, wherein the first single command represents a first duplicate command, for duplicating from a first source logical address to a first destination logical address. The series of operations may include: reading first data at the first source logical address; and writing the first data at the first destination logical address.

16 Claims, 12 Drawing Sheets

(56) References Cited

U.S. PATENT DOCUMENTS

| | | | |
|---|---|---|---|
| 2017/0177222 A1 | 6/2017 | Singh | |
| 2019/0146856 A1 | 5/2019 | Brief | |
| 2019/0259465 A1 | 8/2019 | Subramanian | |
| 2019/0303299 A1 | 10/2019 | Su | |
| 2020/0117368 A1* | 4/2020 | Jiang | G06F 3/061 |
| 2020/0401509 A1 | 12/2020 | Hsu | |
| 2021/0034128 A1* | 2/2021 | Suljic | H02J 7/345 |
| 2021/0034513 A1 | 2/2021 | Kim | |
| 2021/0273652 A1 | 9/2021 | Gad | |
| 2022/0342550 A1* | 10/2022 | Benisty | G06F 3/0611 |
| 2022/0342553 A1* | 10/2022 | Gyllenskog | G06F 3/065 |

FOREIGN PATENT DOCUMENTS

| | | |
|---|---|---|
| CN | 106326133 B | 6/2020 |
| TW | I594123 B | 8/2017 |
| TW | I606338 B | 11/2017 |
| TW | 202001573 A | 1/2020 |
| TW | 202117543 A | 5/2021 |

OTHER PUBLICATIONS

What is NVMe™ and why is it important? A Technical Guide; Western Digital; Jun. 9, 2020; retrieved from https://blog.westerndigital.com/nvme-important-data-driven-businesses/.

\* cited by examiner

METHOD AND APPARATUS FOR PERFORMING DATA ACCESS CONTROL OF MEMORY DEVICE WITH AID OF PREDETERMINED COMMAND

CROSS REFERENCE TO RELATED APPLICATIONS

This application claims the benefit of U.S. Provisional Application No. 63/273,121, which was filed on Oct. 28, 2021, and is incorporated herein by reference.

BACKGROUND OF THE INVENTION

1. Field of the Invention

The present invention is related to memory control, and more particularly, to a method and apparatus for performing data access control of a memory device with aid of a predetermined command (e.g., a duplicate command).

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. When a manufacture tries to implement some features of the memory device according to existing specification, some problems may occur. More particularly, the memory device may spend too much time on performing some internal operations of the memory device in response to host-side requests, causing the overall performance to be reduced. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access control of a memory device with aid of a predetermined command (e.g., a duplicate command), in order to solve the above-mentioned problems.

At least one embodiment of the present invention provides a method for performing data access control of a memory device with aid of a predetermined command, where the method can be applied to a memory controller of the memory device. The memory device may comprise the memory controller and a non-volatile (NV) memory, and the NV memory may comprise at least one NV memory element (e.g., one or more NV memory elements). The method may comprise: utilizing the memory controller to receive a first single command from a host device through a transmission interface circuit of the memory controller; and in response to the first single command conforming to a predetermined format of the predetermined command, utilizing the memory controller to perform a series of operations according to the first single command, wherein the first single command represents a first duplicate command, for duplicating first data from a first source logical address to a first destination logical address. In addition, the series of operations may comprise: reading the first data at the first source logical address by reading the first data at a first source physical address, wherein the first source physical address is associated with the first source logical address; and writing the first data at the first destination logical address by writing the first data at a first destination physical address, wherein the first destination physical address is associated with the first destination logical address.

In addition to the above method, the present invention also provides a memory controller of a memory device, where the memory device comprises the memory controller and a NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller, wherein the processing circuit is arranged to perform data access control of the memory device with aid of a predetermined command. The memory controller further comprises a transmission interface circuit, and the transmission interface circuit is arranged to perform communications with the host device. For example, the memory controller receives a first single command from the host device through the transmission interface circuit of the memory controller; and in response to the first single command conforming to a predetermined format of the predetermined command, the memory controller performs a series of operations according to the first single command, wherein the first single command represents a first duplicate command, for duplicating first data from a first source logical address to a first destination logical address. Additionally, the series of operations may comprise: reading the first data at the first source logical address by reading the first data at a first source physical address, wherein the first source physical address is associated with the first source logical address; and writing the first data at the first destination logical address by writing the first data at a first destination physical address, wherein the first destination physical address is associated with the first destination logical address.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

At least one embodiment of the present invention provides a method for performing data access control of a memory device with aid of a predetermined command, where the method can be applied to a host device coupled to the memory device. The memory device may comprise a memory controller and a non-volatile (NV) memory, and the NV memory may comprise at least one NV memory element (e.g., one or more NV memory elements). The method may comprise: sending a first single command, the first single command conforming to a predetermined format of the predetermined command, from the host device to the memory controller through a transmission interface circuit of the host device, to trigger the memory controller to perform a series of operations according to the first single command, wherein the first single command represents a first duplicate command, for duplicating first data from a first source logical address to a first destination logical address. In addition, the series of operations may comprise: reading the first data at the first source logical address by reading the first data at a first source physical address, wherein the first source physical address is associated with the first source logical address; and writing the first data at the first destination logical address by writing the first data at a first destination physical address, wherein the first destination physical address is associated with the first destination logical address.

In addition to the method mentioned above, the present invention also provides the host device that operates according to the method.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the host device. In some examples, the apparatus may comprise the electronic device.

According to some embodiments, the memory controller of the memory device may control the operations of the memory device according to the method, and the memory device may be installed in the electronic device. In addition, the memory device may store data for the host device. The memory device may read the stored data in response to a host command from the host device, and provide the host device with the data read from the NV memory.

The present invention method and apparatus can guarantee that the memory device can operate properly in various situations, and more particularly, prevent spending too much time on performing some internal operations of the memory device in response to host-side requests. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
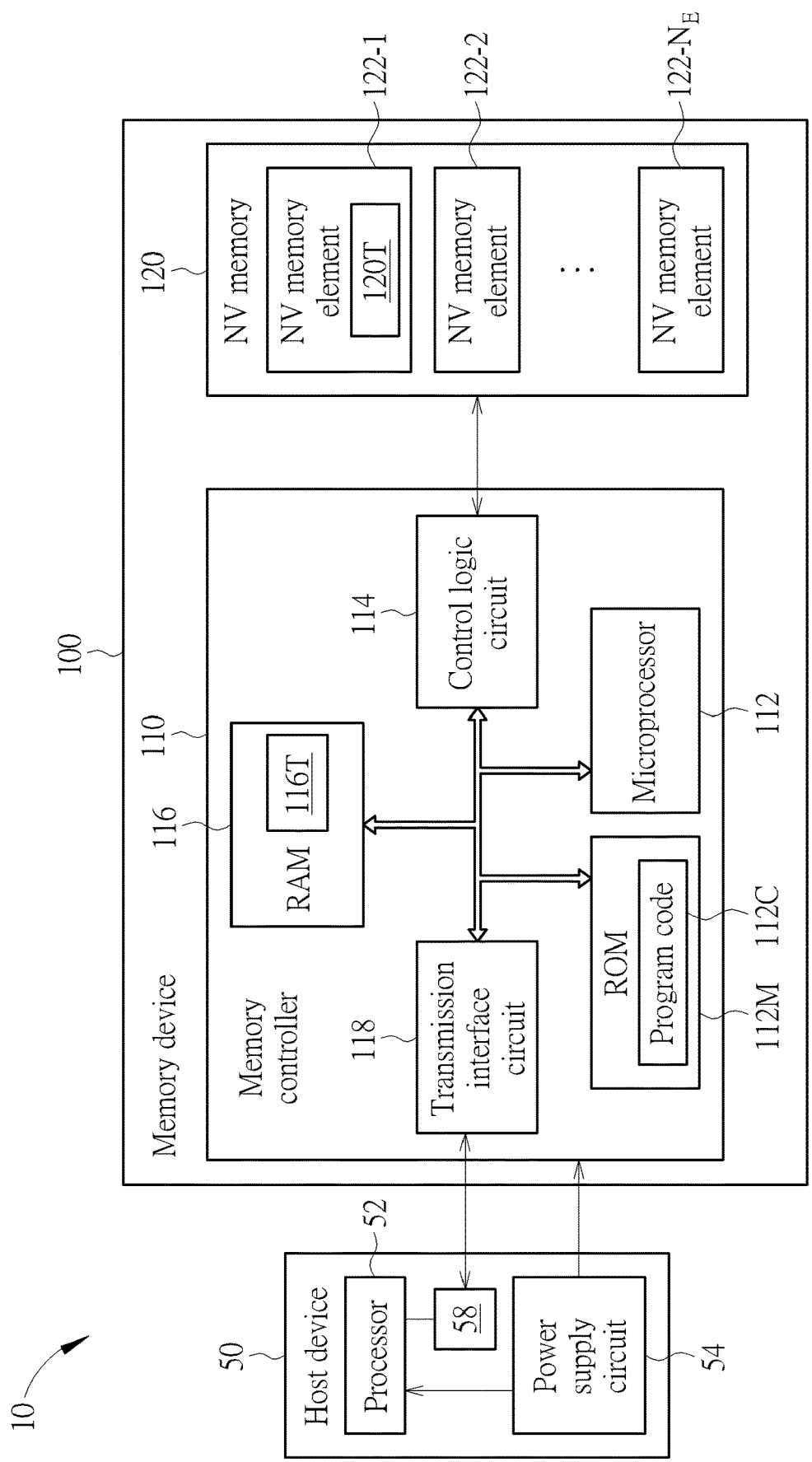
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-$N_E$, where "$N_E$" may represent a positive integer that is greater than one. For example, the NV memory 120 may be a flash memory, and the plurality of NV memory elements 122-1, 122-2, . . . , and 122-$N_E$ may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, Non-Volatile Memory Express (NVMe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specifications for the host device 50.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses, where the NV memory 120 may store a global L2P address mapping table 120T, for the memory controller 110 to control the memory device 100 to access data in the NV memory 120, but the present invention is not limited thereto.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-$N_E$, and more particularly, may be stored in the NV memory elements 122-1, 122-2, . . . , and 122-$N_E$, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

In addition, the aforementioned at least one NV memory element (e.g., the one or more NV memory elements such as {122-1, 122-2, . . . , 122-$N_E$}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval [1, $N_E$]) within the NV memory elements 122-1, 122-2, . . . , and 122-$N_E$, may comprise multiple blocks, and a block within the multiple blocks may comprise and record a specific number of pages, where the memory controller 110 may access a certain page of a certain block within the multiple blocks according to a block address and a page address.

Figure 2:
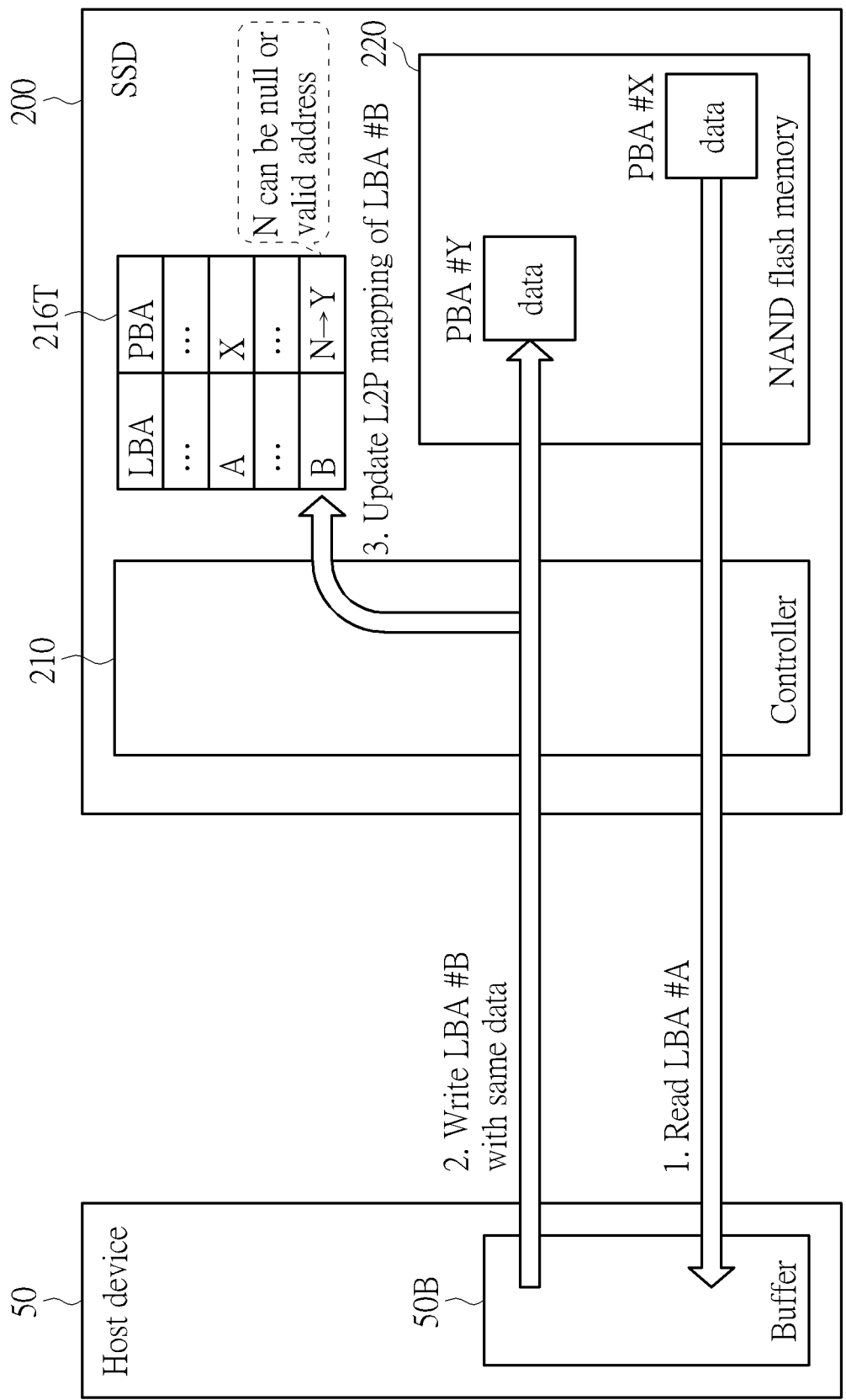
FIG. 2 illustrates a data copy control scheme related to a NAND flash memory.

FIG. 2 illustrates a data copy control scheme related to a NAND flash memory 220, where the SSD 200, the controller 210, the L2P address mapping table 216T and the NAND flash memory 220 can be taken as examples of the memory device 100, the memory controller 110, the temporary L2P address mapping table 116T and the NV memory 120, respectively. The operations of this data copy control scheme may comprise:
(1) the host device 50 may send a read command carrying the logical block address (LBA) #A to the controller 210 to read data at the LBA #A (labeled "Read LBA #A" for brevity), where the controller 210 may read the data at the physical block address (PBA) #X for being returned to the host device 50; and
(2) the host device 50 may send a write command carrying the LBA #B to the controller 210 to write the same data at the LBA #B (labeled "Write LBA #B with same data" for brevity), where the controller 210 may write the data at the PBA #Y and update the L2P mapping information N (e.g., N can be null or a valid address such as the PBA #N) of the LBA #B in the L2P address mapping table 216T (labeled "Update L2P mapping of LBA #B" for brevity);
but the present invention is not limited thereto.

Figure 3:
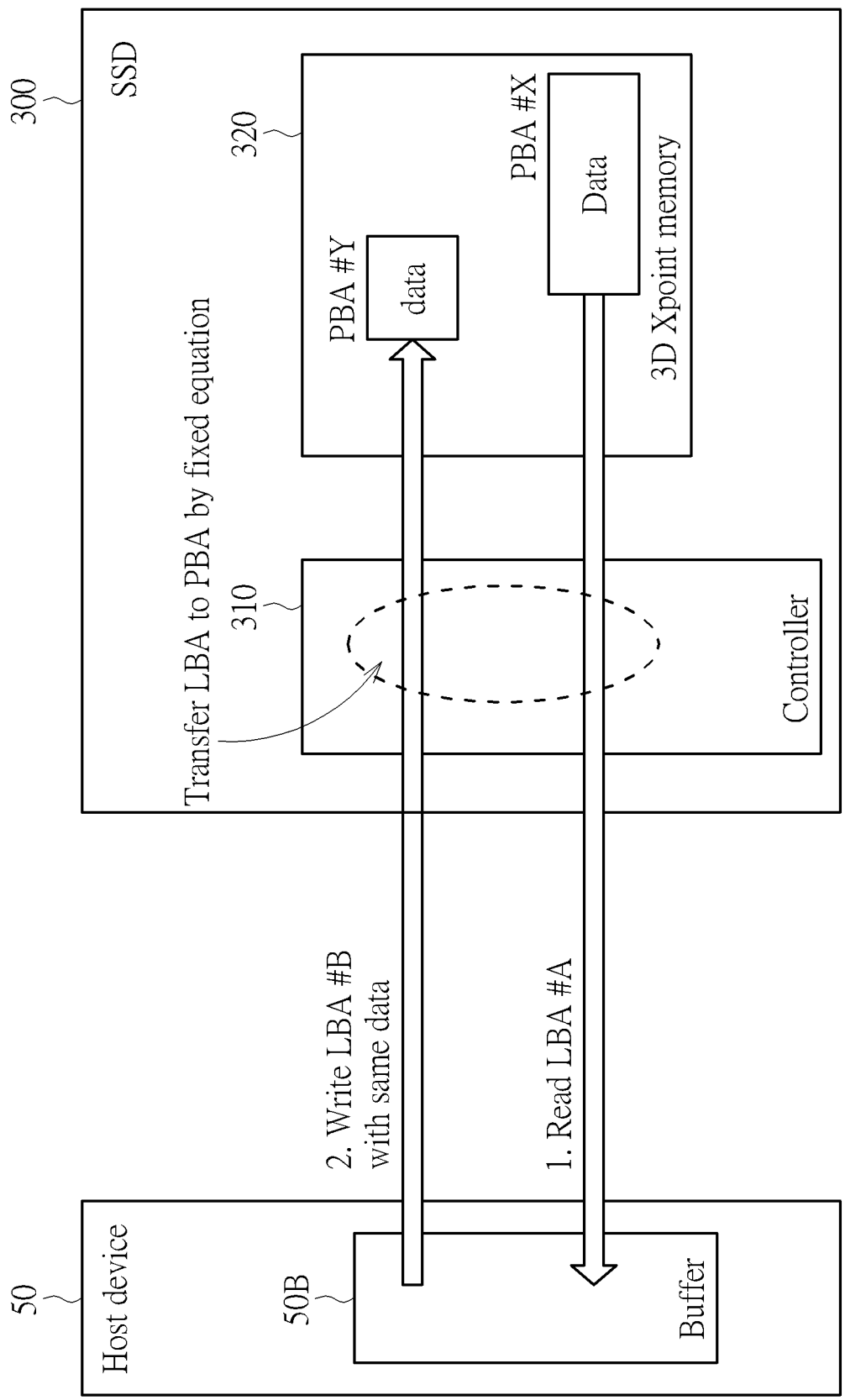
FIG. 3 illustrates a data copy control scheme related to a three-dimensional (3D) cross point (XPoint) memory.

FIG. 3 illustrates a data copy control scheme related to a 3D XPoint memory 320, where the SSD 300, the controller 310 and the 3D XPoint memory 320 can be taken as examples of the memory device 100, the memory controller 110 and the NV memory 120, respectively. The controller 310 may convert (e.g., redirect or transfer) multiple LBAs to multiple PBAs by a fixed equation. The operations of this data copy control scheme may comprise:

(1) the host device 50 may send the read command carrying the LBA #A to the controller 310 to read data at the LBA #A (labeled "Read LBA #A" for brevity), where the controller 310 may read the data at the PBA #X for being returned to the host device 50; and (2) the host device 50 may send the write command carrying the LBA #B to the controller 310 to write the same data at the LBA #B (labeled "Write LBA #B with same data" for brevity), where the controller 310 may write the data at the PBA #Y;

but the present invention is not limited thereto.

Figure 4:
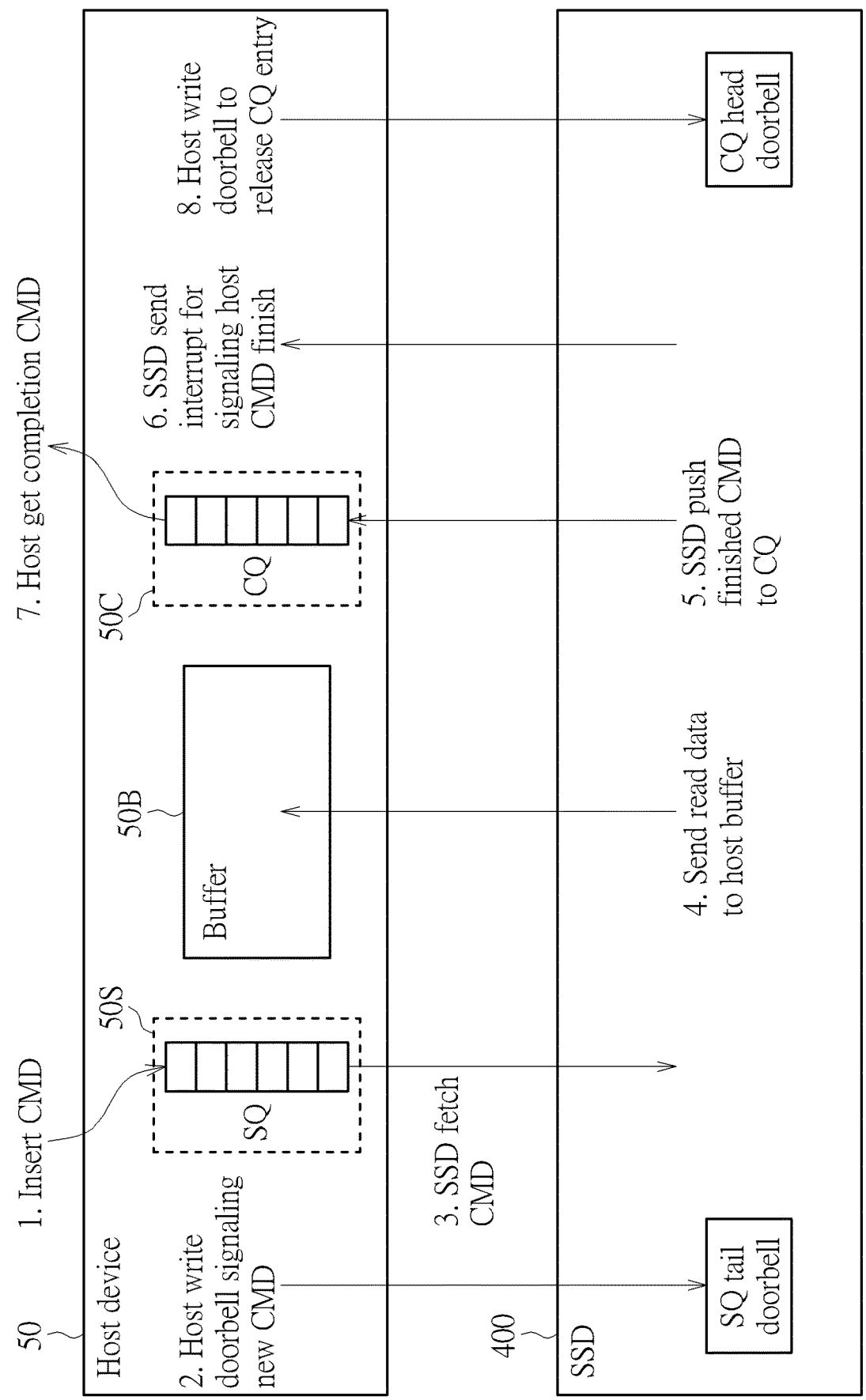
FIG. 4 illustrates some operations associated with a read command (CMD).

FIG. 4 illustrates some operations associated with the read command, where the SSD 400 may represent any of the SSDs 200 and 300. The operations associated with the read command may comprise:

(1) the host device 50 may insert a host command (CMD) such as the read command into a submission queue (SQ) 50S (labeled "Insert CMD" for brevity);

(2) the host device 50 may write a first doorbell at the SSD side, such as the SQ tail doorbell, for signaling the new command such as the host command (labeled "Host write doorbell signaling new CMD" for brevity);

(3) the SSD 400 may fetch the host command such as the read command from the SQ 50S (labeled "SSD fetch CMD" for brevity);

(4) the SSD 400 may send read data, such as the data read from the NAND flash memory 220 or the 3D XPoint memory 320, to the buffer 50B at the host side (labeled "Send read data to host buffer" for brevity);

(5) the SSD 400 may push the finished command, such as the completion information of the host command, to a completion queue (CQ) 50C;

(6) the SSD 400 may send an interrupt for signaling that the host command is completed (labeled "SSD send interrupt for signaling host CMD finish" for brevity);

(7) the host device 50 may get the completion information of the host command from the CQ 50C (labeled "Host get completion CMD" for brevity); and (8) the host device 50 may write a second doorbell at the SSD side, such as the CQ head doorbell, to release the CQ entry (labeled "Host write doorbell to release CQ entry" for brevity);

but the present invention is not limited thereto.

Figure 5:
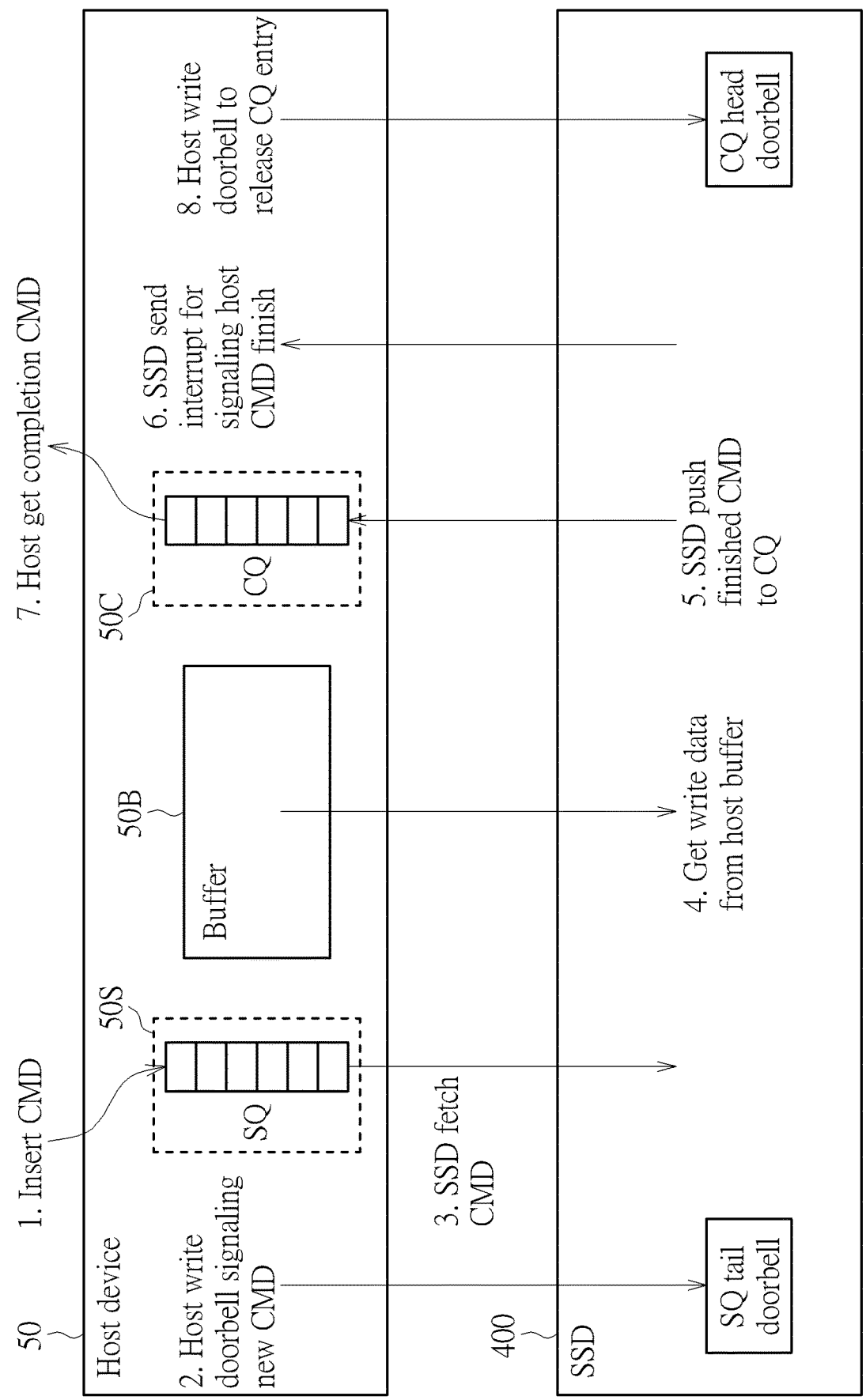
FIG. 5 illustrates some operations associated with a write command.

FIG. 5 illustrates some operations associated with the write command. The operations associated with the write command may comprise:

(1) the host device 50 may insert a host command (CMD) such as the write command into the SQ 50S (labeled "Insert CMD" for brevity);

(2) the host device 50 may write the first doorbell at the SSD side, such as the SQ tail doorbell, for signaling the new command such as the host command (labeled "Host write doorbell signaling new CMD" for brevity);

(3) the SSD 400 may fetch the host command such as the write command from the SQ 50S (labeled "SSD fetch CMD" for brevity);

(4) the SSD 400 may get write data, such as the data to be written into the NAND flash memory 220 or the 3D XPoint memory 320, from the buffer 50B at the host side (labeled "Get write data from host buffer" for brevity);

(5) the SSD 400 may push the finished command, such as the completion information of the host command, to the CQ 50C;

(6) the SSD 400 may send an interrupt for signaling that the host command is completed (labeled "SSD send interrupt for signaling host CMD finish" for brevity);

(7) the host device 50 may get the completion information of the host command from the CQ 50C (labeled "Host get completion CMD" for brevity); and (8) the host device 50 may write the second doorbell at the SSD side, such as the CQ head doorbell, to release the CQ entry (labeled "Host write doorbell to release CQ entry" for brevity);

but the present invention is not limited thereto.

Figure 6:
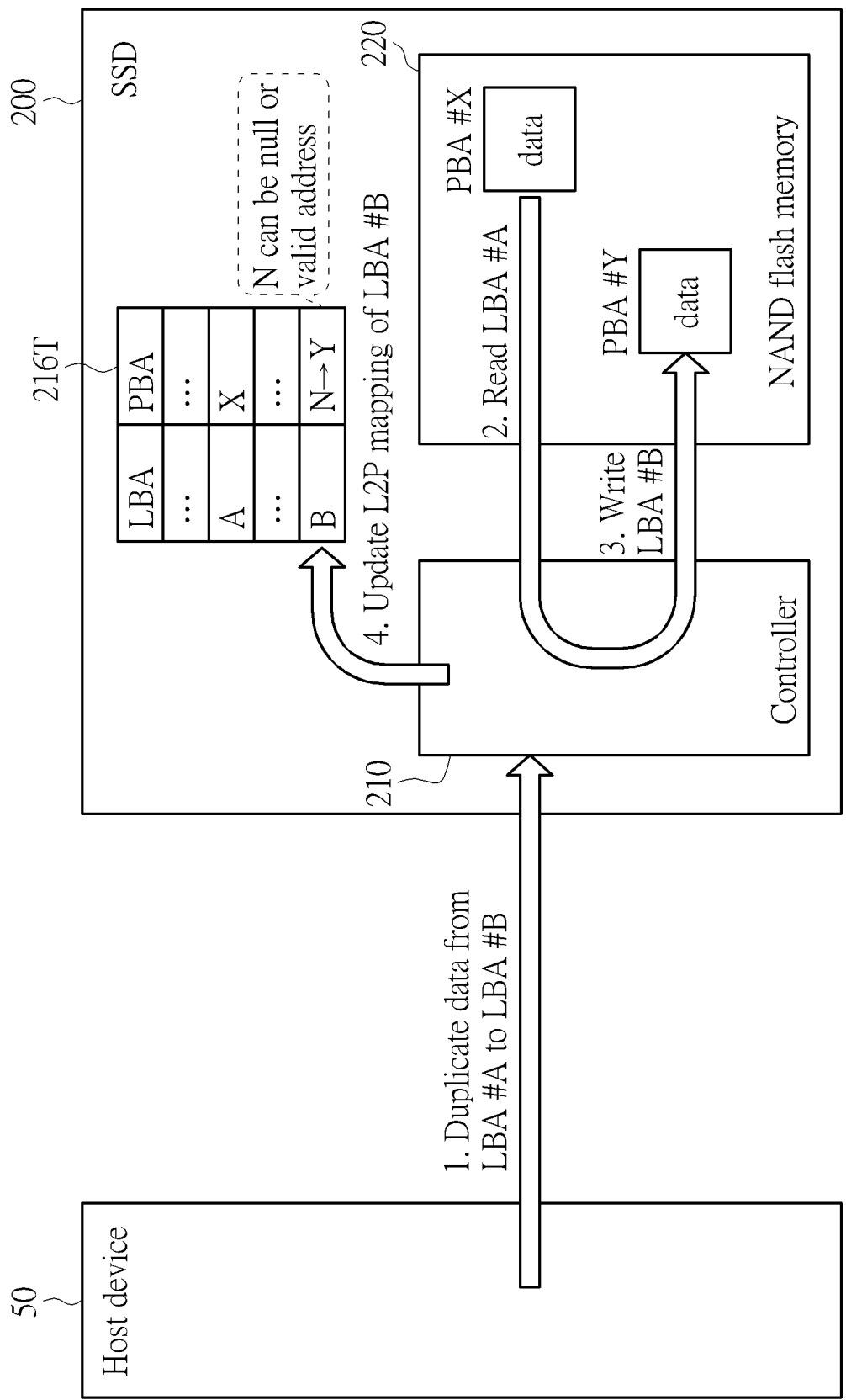
FIG. 6 illustrates a first data duplication control scheme of a method for performing data access control of a memory device with aid of a predetermined command such as a duplicate command according to an embodiment of the present invention.

FIG. 6 illustrates a first data duplication control scheme of a method for performing data access control of a memory device such as the memory device 100 shown in FIG. 1 (e.g., the SSD 200) with aid of a predetermined command such as a duplicate command according to an embodiment of the present invention. The operations of the first data duplication control scheme may comprise:

(1) the host device 50 may send the duplicate command carrying the LBA #A and the LBA #B to the controller 210 to duplicate data from the LBA #A to the LBA #B (labeled "Duplicate data from LBA #A to LBA #B" for brevity); and (2) the controller 210 may read the data at the LBA #A by reading the data at the PBA #X (labeled "Read LBA #A" for brevity), write the same data at the LBA #B by writing the data at the PBA #Y (labeled "Write LBA #B" for brevity), and update the L2P mapping information N (e.g., N can be null or a valid address such as the PBA #N) of the LBA #B in the L2P address mapping table 216T (labeled "Update L2P mapping of LBA #B" for brevity);

but the present invention is not limited thereto.

Figure 7:
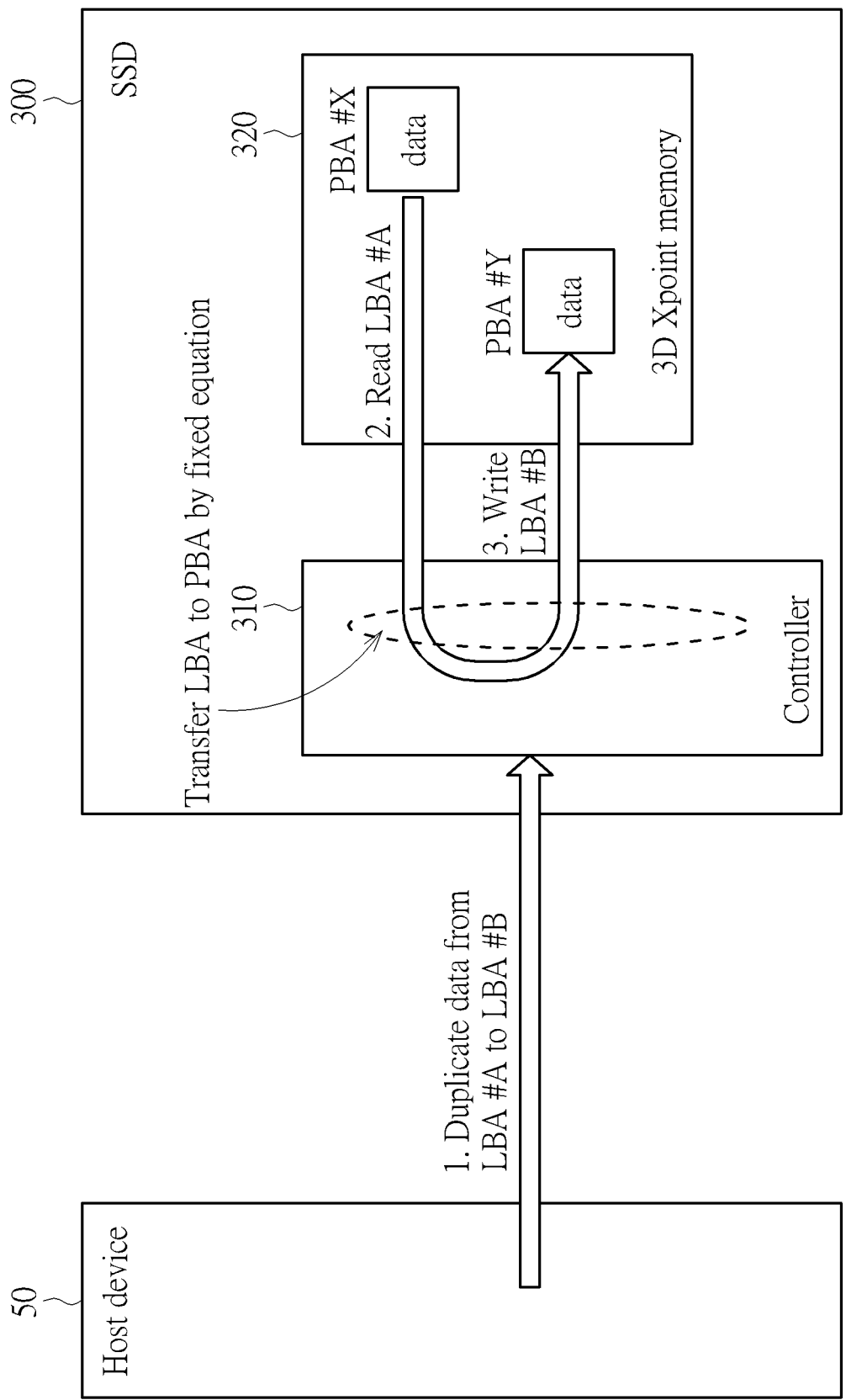
FIG. 7 illustrates a second data duplication control scheme of the method for performing data access control of the memory device with aid of the predetermined command such as the duplicate command according to an embodiment of the present invention.

FIG. 7 illustrates a second data duplication control scheme of the method for performing data access control of the memory device such as the memory device 100 shown in FIG. 1 (e.g., the SSD 300) with aid of the predetermined command such as the duplicate command according to an embodiment of the present invention. The operations of the second data duplication control scheme may comprise:

(1) the host device 50 may send the duplicate command carrying the LBA #A and the LBA #B to the controller 310 to duplicate data from the LBA #A to the LBA #B (labeled "Duplicate data from LBA #A to LBA #B" for brevity); and (2) the controller 310 may read the data at the LBA #A by reading the data at the PBA #X (labeled "Read LBA #A" for brevity), and write the same data at the LBA #B by writing the data at the PBA #Y (labeled "Write LBA #B" for brevity);

where the controller 310 may convert (e.g., redirect or transfer) the multiple LBAs such as the LBA #A, the LBA #B, etc. to the multiple PBAs such as the PBA #X, the PBA #Y, etc. by the fixed equation, respectively, but the present invention is not limited thereto.

According to some embodiments, it is suggested to add the predetermined command such as the duplicate command into the NVMe protocol. In response to the predetermined command such as the duplicate command, the memory controller 110 is capable of copying data from at least one source address such as a source LBA (e.g., the LBA #A) to at least one destination address such as a destination LBA (e.g., the LBA #B) within the memory device 100, having no need to perform data transfer between the host device 50 and the memory device 100. Regarding copying the data from the source address to the destination address, using the predetermined command such as the duplicate command can reduce the number of host commands required for controlling the memory device 100 and prevent the data transfer between the host device 50 and the memory device 100. For example, the number of host commands used in the first data duplication control scheme shown in FIG. 6, such as one, is less than the number of host commands used in the data copy control scheme shown in FIG. 2, such as two, and the architecture shown in FIG. 6 can operate smoothly, having no need to perform the data transfer between the host device 50 and the memory device 100 (e.g., the SSD 200) as shown in FIG. 2. For another example, the number of host commands used in the second data duplication control scheme shown in FIG. 7, such as one, is less than the number of host commands used in the data copy control scheme shown in FIG. 3, such as two, and the architecture shown in FIG. 7 can operate smoothly, having no need to perform the data transfer between the host device 50 and the memory device 100 (e.g., the SSD 300) as shown in FIG. 3. In addition, the back-end bandwidth of the memory device 100, such as the transmission bandwidth between the memory controller 110 and the NV memory 120, may be much greater than the front-end bandwidth of the memory device 100, such as the transmission bandwidth between the memory controller 110 and the host device 50. In this situation, copying the data from the source address to the destination address within the memory device 100 by the memory controller 110 without triggering the data transfer between the host device 50 and the memory device 100 can enhance the overall performance.

According to some embodiments, it is suggested to add the predetermined command such as the duplicate command into the NVMe command set. In response to the predetermined command such as the duplicate command, the memory controller 110 is capable of copying data from at least one source address range such as a source LBA range to at least one destination address range such as a destination LBA range within the memory device 100, having no need to perform data transfer between the host device 50 and the memory device 100. For example, the source LBA range may comprise multiple source LBAs such as the LBA #A, etc., and the destination LBA range may comprise multiple destination LBAs such as the LBA #B, etc. In addition, the predetermined command such as the duplicate command may carry the at least one source address range such as the source LBA range and the at least one destination address range such as the destination LBA range. When receiving the predetermined command such as the duplicate command, the memory controller 110 can copy the data from the at least one source address range to the at least one destination address range within the memory device 100, having no need to perform data transfer between the host device 50 and the memory device 100.

Figure 8:
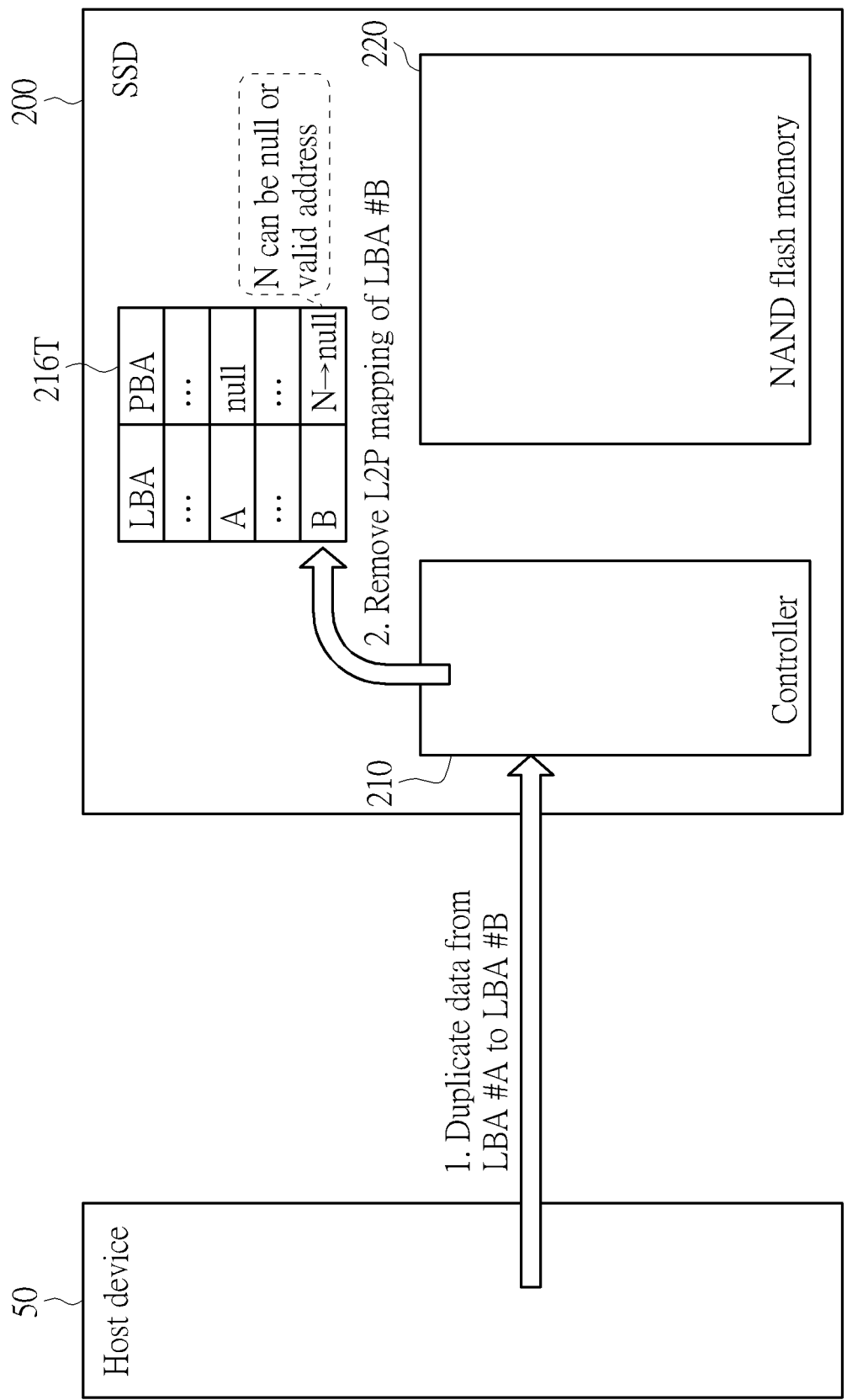
FIG. 8 illustrates a third data duplication control scheme of the method for performing data access control of the memory device with aid of the predetermined command such as the duplicate command according to an embodiment of the present invention.

FIG. 8 illustrates a third data duplication control scheme of the method for performing data access control of the memory device such as the memory device 100 shown in FIG. 1 (e.g., the SSD 200) with aid of the predetermined command such as the duplicate command according to an embodiment of the present invention. The operations of the third data duplication control scheme may comprise:

(1) the host device 50 may send the duplicate command carrying the LBA #A and the LBA #B to the controller 210 to duplicate data from the LBA #A to the LBA #B (labeled "Duplicate data from LBA #A to LBA #B" for brevity); and (2) when detecting that the L2P mapping information of the LBA #A is null, indicating that no valid data exists at the source LBA such as the LBA #A (which may be regarded as empty in this situation), the controller 210 may remove the L2P mapping information of the LBA #B by overwriting the L2P mapping information N (e.g., N can be null or a valid address such as the PBA #N) of the LBA #B to be null in the L2P address mapping table 216T (labeled "Remove L2P mapping of LBA #B" for brevity);

but the present invention is not limited thereto.

Figure 9:
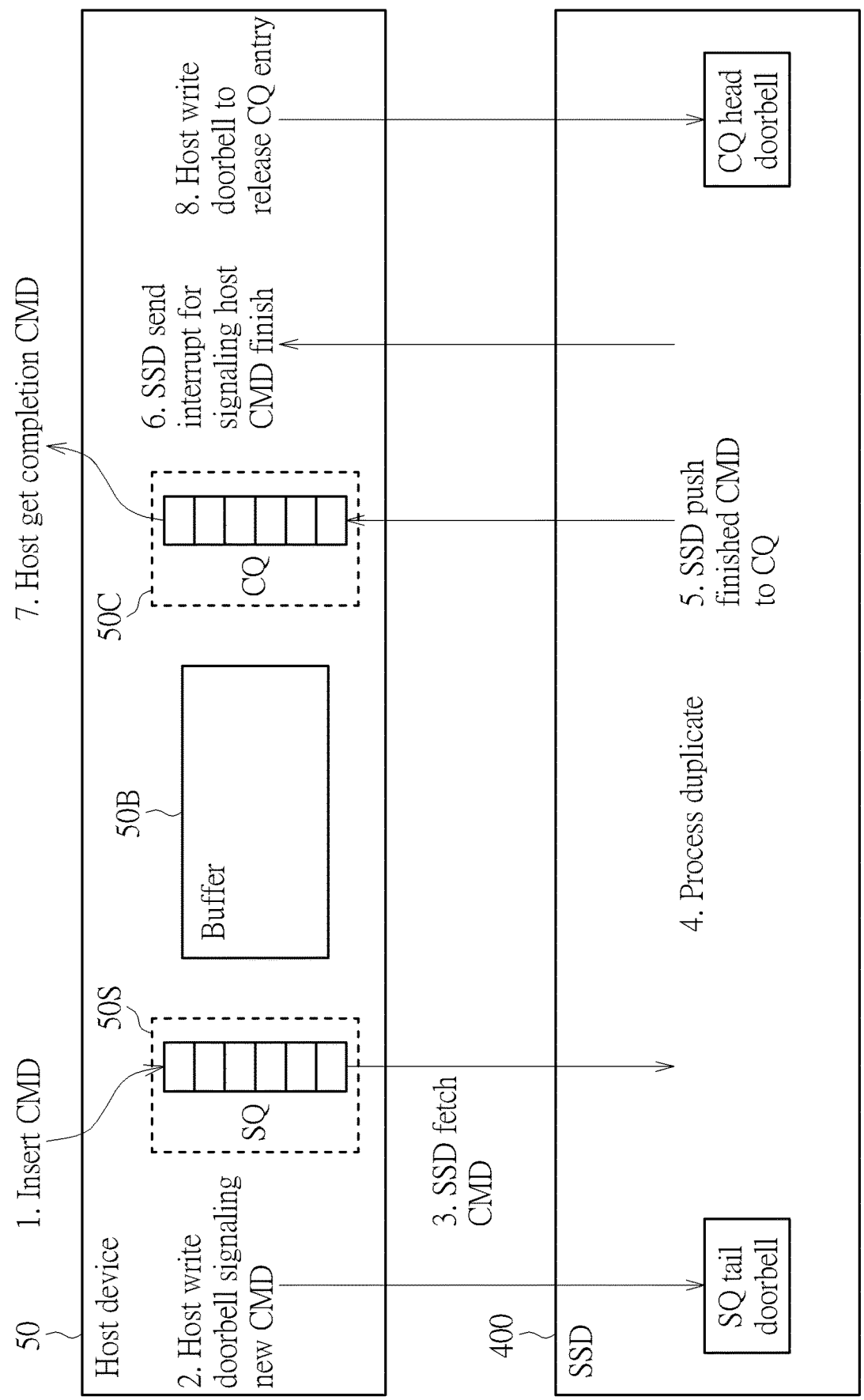
FIG. 9 illustrates some operations associated with the predetermined command (e.g., the duplicate command) executed with respect to a single range according to an embodiment of the present invention.

FIG. 9 illustrates some operations associated with the predetermined command (e.g., the duplicate command) executed with respect to a single range according to an embodiment of the present invention. The operations associated with the predetermined command (e.g., the duplicate command) may comprise:

(1) the host device 50 may insert a host command (CMD) such as the duplicate command into the SQ 50S (labeled "Insert CMD" for brevity);

(2) the host device 50 may write the first doorbell at the SSD side, such as the SQ tail doorbell, for signaling the new command such as the host command (labeled "Host write doorbell signaling new CMD" for brevity);

(3) the SSD 400 may fetch the host command such as the duplicate command from the SQ 50S (labeled "SSD fetch CMD" for brevity);

(4) the SSD 400 may process the duplicate command (labeled "Process duplicate" for brevity), having no need to access the buffer 50B at the host side;

(5) the SSD 400 may push the finished command, such as the completion information of the host command, to the CQ 50C;

(6) the SSD 400 may send an interrupt for signaling that the host command is completed (labeled "SSD send interrupt for signaling host CMD finish" for brevity);

(7) the host device 50 may get the completion information of the host command from the CQ 50C (labeled "Host get completion CMD" for brevity); and (8) the host device 50 may write the second doorbell at the SSD side, such as the CQ head doorbell, to release the CQ entry (labeled "Host write doorbell to release CQ entry" for brevity);

but the present invention is not limited thereto.

Figure 10:
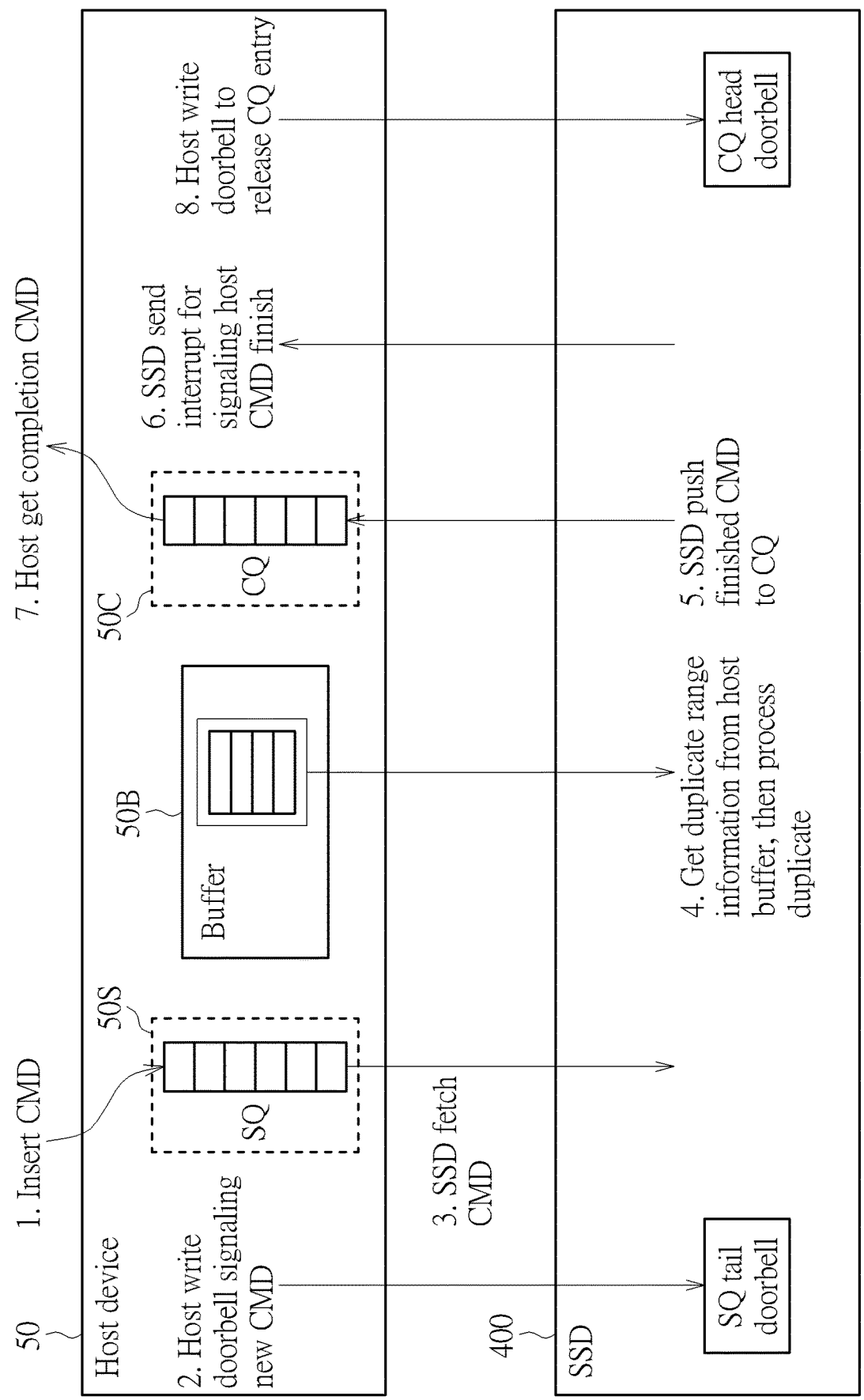
FIG. 10 illustrates some operations associated with the predetermined command (e.g., the duplicate command) executed with respect to multiple ranges according to an embodiment of the present invention.

FIG. 10 illustrates some operations associated with the predetermined command (e.g., the duplicate command) executed with respect to multiple ranges according to an embodiment of the present invention. The operations associated with the predetermined command (e.g., the duplicate command) may comprise:

(1) the host device 50 may insert a host command (CMD) such as the duplicate command into the SQ 50S (labeled "Insert CMD" for brevity);

(2) the host device 50 may write the first doorbell at the SSD side, such as the SQ tail doorbell, for signaling the new command such as the host command (labeled "Host write doorbell signaling new CMD" for brevity);

(3) the SSD 400 may fetch the host command such as the duplicate command from the SQ 50S (labeled "SSD fetch CMD" for brevity);

(4) the SSD 400 may get duplicate range information, such as the source address range information indicating multiple source address ranges of the duplication and the associated destination address range information indicating multiple destination address ranges of the duplication, from the buffer 50B at the host side, and then process the duplicate command according to the duplicate range information (labeled "Get duplicate range information from host buffer, then process duplicate" for brevity);

(5) the SSD 400 may push the finished command, such as the completion information of the host command, to the CQ 50C;

(6) the SSD 400 may send an interrupt for signaling that the host command is completed (labeled "SSD send interrupt for signaling host CMD finish" for brevity);

(7) the host device 50 may get the completion information of the host command from the CQ 50C (labeled "Host get completion CMD" for brevity); and (8) the host device 50 may write the second doorbell at the SSD side, such as the CQ head doorbell, to release the CQ entry (labeled "Host write doorbell to release CQ entry" for brevity);

but the present invention is not limited thereto.

Figure 11:
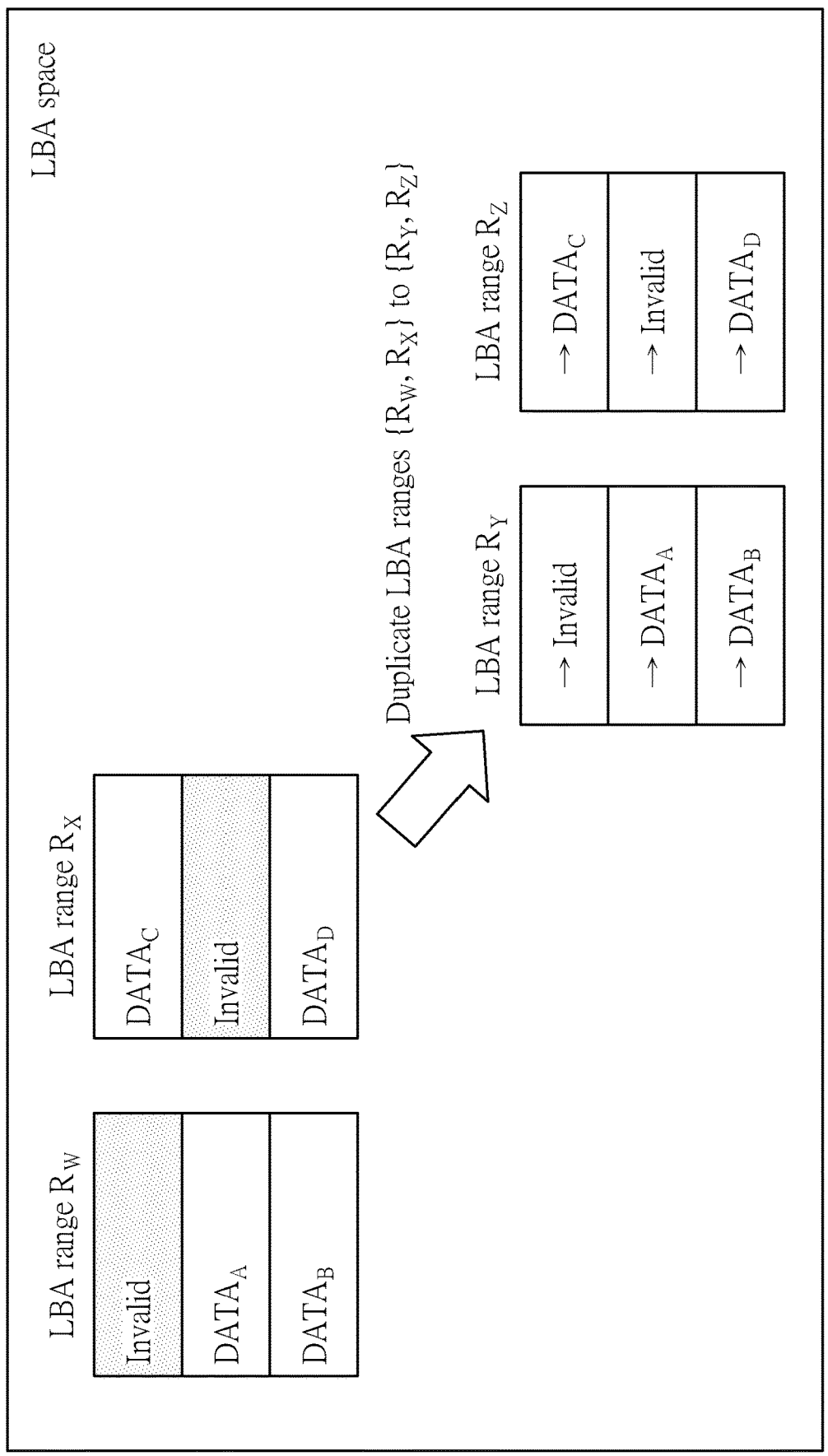
FIG. 11 illustrates some operations associated with the predetermined command (e.g., the duplicate command) executed in a special case according to an embodiment of the present invention.

FIG. 11 illustrates some operations associated with the predetermined command (e.g., the duplicate command) executed in a special case according to an embodiment of the present invention. When the predetermined command such as the duplicate command is executed with respect to the multiple ranges, the SSD 400 may get the duplicate range information mentioned above, such as the source address range information indicating the multiple source address ranges (e.g., the LBA ranges $\{R_W, R_X\}$) of the duplication and the associated destination address range information indicating the multiple destination address ranges (e.g., the LBA ranges $\{R_Y, R_Z\}$) of the duplication, and then process the duplicate command according to the duplicate range information to duplicate the data $\{\{DATA_A, DATA_B\}, \{DATA_C, DATA_D\}\}$ from the multiple source address ranges such as the LBA ranges $\{R_W, R_X\}$ to the multiple destination address ranges such as the LBA ranges $\{R_Y, R_Z\}$, respectively.

During the duplication, when detecting that the L2P mapping information of a first partial LBA range of the LBA range $R_W$ and the L2P mapping information of a second partial LBA range of the LBA range $R_X$ are null (e.g., the first partial LBA range and the second partial LBA range has not been written), indicating that no valid data exists in the first partial LBA range and the second partial LBA range (which may be regarded as empty in this situation), the controller 210 may deallocate a first corresponding partial LBA range of the LBA range $R_Y$ (e.g., a partial LBA range among multiple partial LBA ranges of the LBA range $R_Y$ that corresponds to the first partial LBA range) and a second corresponding partial LBA range of the LBA range $R_Z$ (e.g., a partial LBA range among multiple partial LBA ranges of the LBA range $R_Z$ that corresponds to the second partial LBA range), and more particularly, remove first L2P mapping information of the first corresponding partial LBA range of the LBA range $R_Y$ and second L2P mapping information of the second corresponding partial LBA range of the LBA range $R_Z$ by overwriting the first L2P mapping information and the second L2P mapping information to be null in the L2P address mapping table 216T, respectively, to make the first corresponding partial LBA range of the LBA range $R_Y$ and the second corresponding partial LBA range of the LBA range $R_Z$ be invalid (labeled "Invalid" in the corresponding partial LBA ranges of the LBA ranges $R_Y$ and $R_Z$ for brevity), respectively. For example, if there is any data in any partial LBA range among the first partial LBA range and the second partial LBA range, the any data should be regarded as invalid. For another example, if there is any data in any partial LBA range among the first corresponding partial LBA range and the second corresponding partial LBA range, the any data should be regarded as invalid. For brevity, similar descriptions for this embodiment are not repeated in detail here.

According to some embodiments, the LBA range $R_W$ and the first partial LBA range thereof may be regarded as multiple LBA ranges and one of the multiple LBA ranges, respectively. Similarly, the LBA range $R_X$ and the second partial LBA range thereof may be regarded as multiple LBA ranges and one of the multiple LBA ranges, respectively. In addition, the LBA range $R_Y$ and the first corresponding partial LBA range thereof may be regarded as multiple LBA ranges and one of the multiple LBA ranges, respectively. Similarly, the LBA range $R_Z$ and the second corresponding partial LBA range thereof may be regarded as multiple LBA ranges and one of the multiple LBA ranges, respectively.

According to some embodiments, the duplicate command for a single range can be defined with Table 1, Table 2, Table 3 and Table 4 (e.g., hexadecimal (hex) numbers may be written with a leading "0x" or a trailing "h" and binary numbers may be written with a trailing "b") as shown below:

TABLE 1

| Opcode by Field | | | | |
|---|---|---|---|---|
| (07) Standard Command | (06:02) Function | (01:00) Data Transfer | Combined Opcode | Command |
| 0b (or 1b) | 001 11b (or any reserved function code) | 00b | 1Ch | Duplicate |

TABLE 2

| Bit | Description |
|---|---|
| 63:00 | Source LBA: This field specifies the 64-bit address of the first logical block to be duplicated from. Command Dword 10 contains bits 31:00; Command Dword 11 contains bits 63:32. |

TABLE 3

| Bit | Description |
|---|---|
| 63:00 | Destination LBA: This field specifies the 64-bit address of the first logical block to be duplicated to. Command Dword 12 contains bits 31:00; Command Dword 13 contains bits 63:32. |

TABLE 4

| Bit | Description |
|---|---|
| 31:16 | Reserved |
| 15:00 | Number of Logical Blocks (NLB): This field indicates the number of logical blocks to be duplicated. This is a 0's based value. |

Regarding the duplicate command "Duplicate" (e.g., "Duplicate" shown in Table 1) which can be used as a new NVM Command, for example:

(1) Table 1 illustrates the Opcode for the NVM Command, where the three fields (i.e., Bit 07, Bits 06:02, and Bits 01:00) thereof may carry 0b (or 1b), 00111b (or any reserved function code), and 00b, respectively, and for the case that the three fields carry 0b, 00111b, and 00b, respectively, their combination {01}, 00111b, 00b} (i.e., 00011100b) can be written as the Combined Opcode 1Ch (i.e., 0x1C);

(2) Table 2 illustrates Command Double Words (Dwords) 10-11 of the duplicate command "Duplicate";

(3) Table 3 illustrates Command Dwords 12-13 of the duplicate command "Duplicate"; and (4) Table 4 illustrates Command Dword 14 of the duplicate command "Duplicate".

Regarding command completion, when the command described above (i.e., the aforementioned duplicate command for the single range, such as the duplicate command "Duplicate" defined with Tables 1-4) is completed with success or failure, the memory controller 110 shall post a completion queue (CQ) entry to the associated input/output (I/O) CQ such as the CQ 50C indicating the status for the command, for example, according to Table 5.

TABLE 5

| Value | Description |
|---|---|
| 81h | Invalid Protection Information: The Protection Information Field (PRINFO) settings specified in the command are invalid for the Protection Information with which the namespace was formatted or the ILBRT field is invalid. |
| 82h | Attempted Write to Read Only Range: The LBA range specified contains read-only blocks. The controller shall not return this status value if the read-only condition on the media is a result of a change in the write protection state of a namespace. |

Table 5 illustrates examples of command specific status values, where some terms mentioned in Table 5 shown above, such as the Protection Information Field (PRINFO), the ILBRT field, etc., and the meanings of these terms, are well known in the related art, and therefore are not explained in detail here for brevity.

According to some embodiments, the duplicate command for multiple ranges can be defined with Table 6, Table 7 and Table 8 with aid of Table 9 (e.g., hex numbers may be written with a leading "0x" or a trailing "h" and binary numbers may be written with a trailing "b") as shown below:

TABLE 6

| Opcode by Field | | | | |
|---|---|---|---|---|
| (07) Standard Command | (06:02) Function | (01:00) Data Transfer | Combined Opcode | Command |
| 0b (or 1b) | 001 10b (or any reserved function code) | 01b | 19h | Duplicate |

TABLE 7

| Bit | Description |
|---|---|
| 127:00 | Data Pointer (DPTR): This field specifies the data to use for the command. |

TABLE 8

| Bit | Description |
|---|---|
| 31:08 | Reserved |
| 07:00 | Number of Ranges (NR): Indicates the number of 16 byte range sets that are specified in the command. This is a 0's based value. |

TABLE 9

| Range | Bytes | Field |
|---|---|---|
| Range 0 | 07:00 | Source LBA |
| | 15:08 | Destination LBA |
| | 23:16 | Length in LBA |
| | 31:24 | Reserved |
| Range 1 | 39:32 | Source LBA |
| | 47:40 | Destination LBA |
| | 55:48 | Length in LBA |
| | 63:56 | Reserved |
| Range 127 | 4071:4064 | Source LBA |
| | 4079:4072 | Destination LBA |
| | 4087:4080 | Length in LBA |
| | 4095:4088 | Reserved |

Regarding the duplicate command "Duplicate" (e.g., "Duplicate" shown in Table 6) which can be used as a new NVM Command, for example:
(1) Table 6 illustrates the Opcode for the NVM Command, where the three fields (i.e., Bit 07, Bits 06:02, and Bits 01:00) thereof may carry 0b (or 1b), 00110b (or any reserved function code), and 01b, respectively, and for the case that the three fields carry 0b, 00110b, and 01b, respectively, their combination {0b, 00110b, 01b} (i.e., 00011001b) can be written as the Combined Opcode 19h (i.e., 0x19);
(2) Table 7 illustrates Data Pointer Command Dwords 6-9 of the duplicate command "Duplicate", where the Data Pointer (DPTR) specifies the aforementioned duplicate range information (e.g., the table contents of Table 9) within the buffer 50B;
(3) Table 8 illustrates Command Dword 10 of the duplicate command "Duplicate"; and
(4) Table 9 illustrates Range Definition of the duplicate command "Duplicate", where the aforementioned duplicate range information can be implemented as shown in Table 9;
where the term "Data Pointer (DPTR)" mentioned in Table 7 shown above, and the meanings of this term, are well known in the related art, and therefore are not explained in detail here for brevity. Regarding command completion, when the command described above (i.e., the aforementioned duplicate command for the multiple ranges, such as the duplicate command "Duplicate" defined with Tables 6-8) is completed with success or failure, the memory controller 110 shall post a completion queue (CQ) entry to the associated input/output (I/O) CQ such as the CQ 50C indicating the status for the command, for example, according to Table 10.

TABLE 10

| Value | Description |
|---|---|
| 81h | Invalid Protection Information: The Protection Information Field (PRINFO) settings specified in the command are invalid for the Protection Information with which the namespace was formatted or the ILBRT field is invalid. |
| 82h | Attempted Write to Read Only Range: The LBA range specified contains read-only blocks. The controller shall not return this status value if the read-only condition on the media is a result of a change in the write protection state of a namespace. |

Table 10 illustrates examples of command specific status values, where some terms mentioned in Table 10 shown above, such as the Protection Information Field (PRINFO), the ILBRT field, etc., and the meanings of these terms, are well known in the related art, and therefore are not explained in detail here for brevity.

Figure 12:
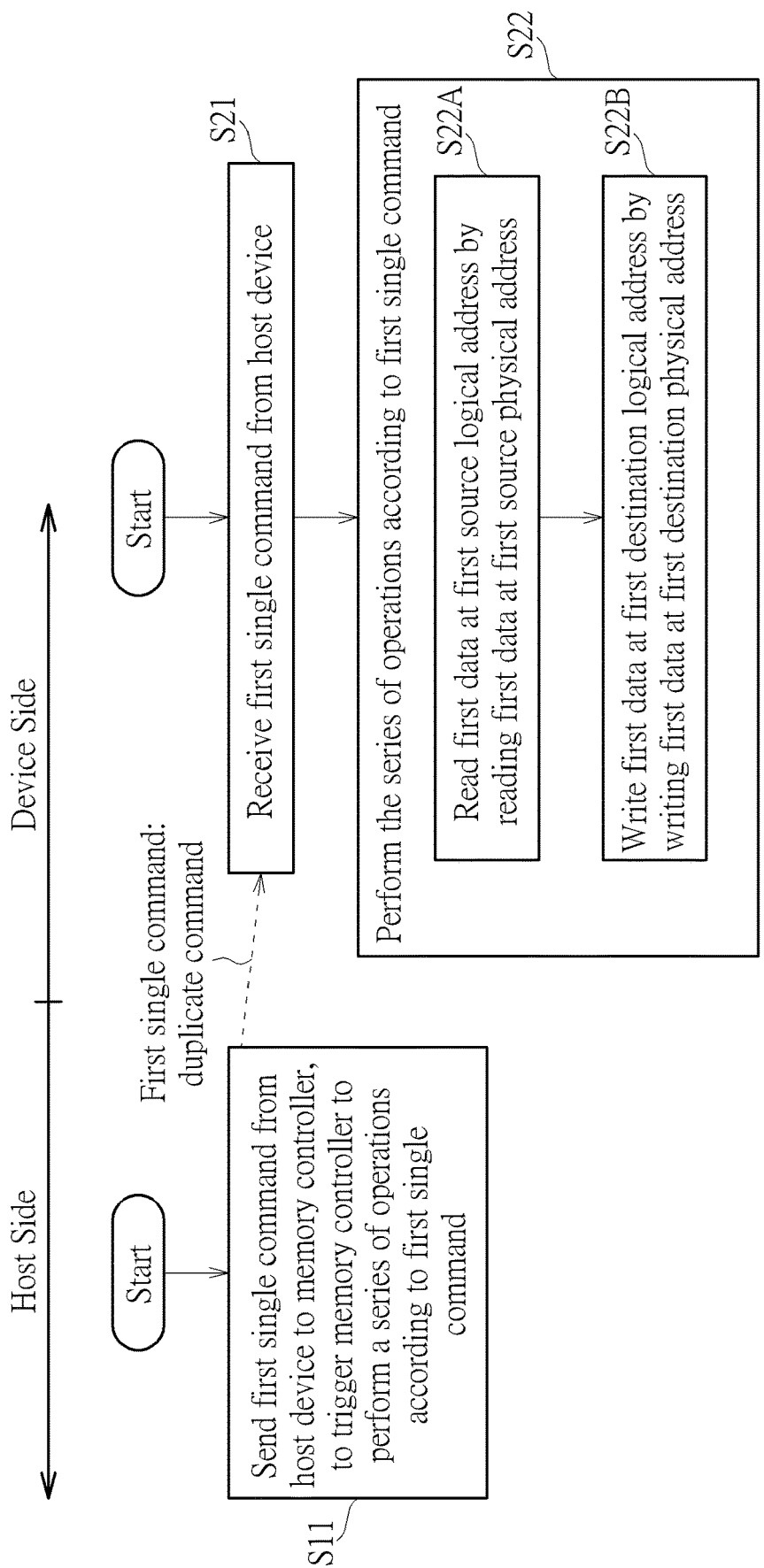
FIG. 12 illustrates a working flow of the method according to an embodiment of the present invention.

FIG. 12 illustrates a working flow of the method according to an embodiment of the present invention, where the method can be applied to the host device 50 and the memory device 100 (e.g., the SSDs 200, 300 and 400). For example, the memory device 100 may represent the SSD 200 shown in FIG. 6, and the memory controller 110 and the NV memory 120 may represent the controller 210 and the NAND flash memory 220 shown in FIG. 6, respectively. For another example, the memory device 100 may represent the SSD 300 shown in FIG. 7, and the memory controller 110 and the NV memory 120 may represent the controller 310 and the 3D XPoint memory 320 shown in FIG. 7, respectively.

In Step S11, the host device 50 can send a first single command, such as the first single command conforming to a predetermined format of the predetermined command (e.g., the duplicate command), from the host device 50 to the memory controller 110 through the transmission interface circuit 58 of the host device 50 (e.g., "1. Duplicate data from LBA #A to LBA #B" shown in any of FIG. 6 and FIG. 7), to trigger the memory controller 110 at the device side (e.g., the SSD side) to perform a series of operations according to the first single command, where the first single command may represent a first duplicate command (e.g., the duplicate command), for duplicating first data from a first source logical address (e.g., the LBA #A shown in one of FIG. 6 and FIG. 7) to a first destination logical address (e.g., the LBA #B shown in one of FIG. 6 and FIG. 7).

In Step S21, the memory device 100 can utilize the memory controller 110 to receive the first single command from the host device 50 through the transmission interface circuit 118 of the memory controller 110 (e.g., "1. Duplicate data from LBA #A to LBA #B" shown in any of FIG. 6 and FIG. 7), where the first single command may represent the first duplicate command (e.g., the duplicate command), for duplicating the first data from the first source logical address (e.g., the LBA #A shown in one of FIG. 6 and FIG. 7) to the first destination logical address (e.g., the LBA #B shown in one of FIG. 6 and FIG. 7).

In Step S22, in response to the first single command conforming to the predetermined format of the predetermined command (e.g., the duplicate command), the memory device 100 can utilize the memory controller 110 to perform the series of operations according to the first single command. For example, Step S22 may comprise some sub-steps such as Steps S22A and S22B, and the series of operations comprise the operations of Steps S22A and S22B.

In Step S22A, the memory device 100 can utilize the memory controller 110 to read the first data at the first source logical address (e.g., "2. Read LBA #A" shown in one of FIG. 6 and FIG. 7) by reading the first data at a first source physical address (e.g., the PBA #X shown in one of FIG. 6 and FIG. 7), where the first source physical address is associated with the first source logical address.

In Step S22B, the memory device 100 can utilize the memory controller 110 to write the first data at the first destination logical address (e.g., "3. Write LBA #B" shown in one of FIG. 6 and FIG. 7) by writing the first data at a first destination physical address (e.g., the PBA #Y shown in one of FIG. 6 and FIG. 7), where the first destination physical address is associated with the first destination logical address.

For example, the NV memory 120 may represent a Flash memory such as the NAND flash memory 220 shown in FIG. 6. In this situation, the series of operations may further comprise: (1) updating L2P mapping information of the first destination logical address, such as the L2P mapping information N of the LBA #B, in a first L2P address mapping table such as the L2P address mapping table 216T (e.g., "4. Update L2P mapping of LBA #B" shown in FIG. 6); but the present invention is not limited thereto. For another example, the NV memory 120 may represent a 3D XPoint memory such as the 3D XPoint memory 320 shown in FIG. 7.

In response to the first duplicate command, the memory controller 110 is capable of copying the first data from at least one source logical address (e.g., one or more source logical addresses) comprising the first source logical address (e.g., the LBA #A) to at least one destination address (e.g., one or more destination logical addresses) comprising the first destination logical address (e.g., the LBA #B) within the memory device 100, having no need to perform data transfer of the first data between the host device 50 and the memory device 100. For brevity, similar descriptions for this embodiment are not repeated in detail here.

For better comprehension, the method may be illustrated with the working flow shown in FIG. 12, but the present invention is not limited thereto. According to some embodiments, one or more steps may be added, deleted, or changed in the working flow shown in FIG. 12. For example, in another step at the host side, the host device 50 can send a second single command, such as the second single command conforming to the predetermined format of the predetermined command (e.g., the duplicate command), from the host device 50 to the memory controller 110 through the transmission interface circuit 58 of the host device 50 (e.g., "1. Duplicate data from LBA #A to LBA #B" shown in FIG. 8), to trigger the memory controller 110 at the device side (e.g., the SSD side) to perform at least one subsequent operation (e.g. one or more subsequent operations) according to the second single command, where the second single command may represent a second duplicate command (e.g., the duplicate command), for duplicating from a second source logical address (e.g., the LBA #A shown in FIG. 8) to a second destination logical address (e.g., the LBA #B shown in FIG. 8). In addition, in another step at the device side, the memory device 100 can utilize the memory controller 110 to receive the second single command from the host device 50 through the transmission interface circuit 118 of the memory controller 110 (e.g., "1. Duplicate data from LBA #A to LBA #B" shown in FIG. 8), where the second single command may represent the second duplicate command (e.g., the duplicate command), for duplicating from the second source logical address (e.g., the LBA #A shown in FIG. 8) to the second destination logical address (e.g., the LBA #B shown in FIG. 8). In a subsequent step at the device side, in response to the second single command conforming to the predetermined format of the predetermined command (e.g., the duplicate command), the memory device 100 can utilize the memory controller 110 to perform the aforementioned at least one subsequent operation (e.g. the one or more subsequent operations) according to the second single command. More particularly, the aforementioned at least one subsequent operation may comprise:

(1) in response to L2P mapping information of the second source logical address, such as the L2P mapping information (labeled "null" in the PBA field) of the LBA #A shown in FIG. 8, in the first L2P address mapping table such as the L2P address mapping table 216T being null, controlling the memory device 100 to make any data at the second destination logical address be invalid data (e.g., "2. Remove L2P mapping of LBA #B" shown in FIG. 8);

but the present invention is not limited thereto. For brevity, similar descriptions for these embodiments are not repeated in detail here.

According to some embodiments, the first duplicate command is applicable to single range duplication such as the duplication of the embodiment shown in FIG. 9, where the predetermined format of the predetermined command (e.g., the duplicate command) may represent the format of the duplicate command "Duplicate" as defined with Tables 1-4. Regarding the single range duplication, multiple operations associated with the first duplicate command may comprise:

(1) the host device 50 may insert the first duplicate command into the SQ 50S within the host device 50 (e.g., "1. Insert CMD" shown in FIG. 9);

(2) the host device 50 may write the first doorbell (e.g., the SQ tail doorbell) within the memory device 100, for signaling the first duplicate command as a new command (e.g., "2. Host write doorbell signaling new CMD" shown in FIG. 9);

(3) the memory device 100 may fetch the first duplicate command from the SQ 50S within the host device 50 (e.g., "3. SSD fetch CMD" shown in FIG. 9);

(4) the memory device 100 may process the first duplicate command, having no need to access the buffer 50B within the host device 50 (e.g., "4. Process duplicate" shown in FIG. 9);

(5) the memory device 100 may push completion information of the first duplicate command to the CQ 50C within the host device 50 (e.g., "5. SSD push finished CMD to CQ" shown in FIG. 9);

(6) the memory device 100 may send an interrupt for signaling that the first duplicate command is completed (e.g., "6. SSD send interrupt for signaling host CMD finish" shown in FIG. 9);

(7) the host device 50 may get the completion information of the first duplicate command from the CQ 50C within the host device 50 (e.g., "7. Host get completion CMD" shown in FIG. 9); and (8) the host device 50 may write the second doorbell (e.g., the CQ head doorbell) within the memory device 100 to release a CQ entry corresponding to the first duplicate command in the CQ (e.g., "8. Host write doorbell to release CQ entry" shown in FIG. 9).

For brevity, similar descriptions for these embodiments are not repeated in detail here.

According to some embodiments, the first duplicate command is applicable to multi-range duplication such as the duplication of the embodiment shown in FIG. 10, where the predetermined format of the predetermined command (e.g., the duplicate command) may represent the format of the duplicate command "Duplicate" as defined with Tables 6-8. Regarding the multi-range duplication, multiple operations associated with the first duplicate command may comprise:

(1) the host device 50 may insert the first duplicate command into the SQ 50S within the host device 50 (e.g., "1. Insert CMD" shown in FIG. 10);

(2) the host device 50 may write the first doorbell (e.g., the SQ tail doorbell) within the memory device 100, for signaling the first duplicate command as a new command (e.g., "2. Host write doorbell signaling new CMD" shown in FIG. 10);

(3) the memory device 100 may fetch the first duplicate command from the SQ 50S within the host device 50 (e.g., "3. SSD fetch CMD" shown in FIG. 10);

(4) the memory device 100 may get duplicate range information (e.g. the aforementioned duplicate range information such as the table contents of Table 9) from the buffer 50B within the host device 50, and then process the first duplicate command (e.g., "4. Get duplicate range information from host buffer, then process duplicate" shown in FIG. 10), where the duplicate range information may comprise the source address range information indicating the multiple source address ranges of the multi-range duplication and the associated destination address range information indicating the multiple destination address ranges of the multi-range duplication, and the first source logical address and the first destination logical address (e.g., the LBA #A and the LBA #B, as shown in one of FIG. 6 and FIG. 7) may represent a source logical address of any source address range of the multiple source address ranges and a destination logical address of any destination address range of the multiple destination address ranges, respectively;

(5) the memory device 100 may push completion information of the first duplicate command to the CQ 50C within the host device 50 (e.g., "5. SSD push finished CMD to CQ" shown in FIG. 10);

(6) the memory device 100 may send an interrupt for signaling that the first duplicate command is completed (e.g., "6. SSD send interrupt for signaling host CMD finish" shown in FIG. 10);

(7) the host device 50 may get the completion information of the first duplicate command from the CQ 50C within the host device 50 (e.g., "7. Host get completion CMD" shown in FIG. 10); and (8) the host device 50 may write the second doorbell (e.g., the CQ head doorbell) within the memory device 100 to release a CQ entry corresponding to the first duplicate command in the CQ (e.g., "8. Host write doorbell to release CQ entry" shown in FIG. 10).

For brevity, similar descriptions for these embodiments are not repeated in detail here.

According to some embodiments, the multiple source address ranges may comprise at least one portion (e.g., a portion or all) of the source address ranges respectively starting from the Source LBAs of Ranges 0, 1, . . . and 127 shown in Table 9 and respectively having the Lengths (measured in LBA) of Ranges 0, 1, . . . and 127, and the multiple destination address ranges may comprise at least one portion (e.g., a portion or all) of the destination address ranges respectively starting from the Destination LBAs of Ranges 0, 1, . . . and 127 shown in Table 9 and respectively having the Lengths (measured in LBA) of Ranges 0, 1, . . . and 127. In this situation, the first source logical address and the first destination logical address (e.g., the LBA #A and the LBA #B, as shown in one of FIG. 6 and FIG. 7) may represent the Source LBA and the Destination LBA of one of Ranges 0, 1, . . . and 127 shown in Table 9. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access control of a memory device with aid of a predetermined command, the method being applied to a memory controller of the memory device, the memory device comprising the memory controller and a non-volatile (NV) memory, the NV memory comprising at least one NV memory element, the method comprising:

utilizing the memory controller to receive a first single command from a host device through a transmission interface circuit of the memory controller;

in response to the first single command conforming to a predetermined format of the predetermined command, utilizing the memory controller to perform a series of operations according to the first single command, wherein the first single command represents a first duplicate command, for duplicating first data from a first source logical address to a first destination logical address, and the series of operations comprise:

reading the first data at the first source logical address by reading the first data at a first source physical address, wherein the first source physical address is associated with the first source logical address; and writing the first data at the first destination logical address by writing the first data at a first destination physical address, wherein the first destination physical address is associated with the first destination logical address;

utilizing the memory controller to receive a second single command from the host device through the transmission interface circuit of the memory controller; and in response to the second single command conforming to the predetermined format of the predetermined command, utilizing the memory controller to perform at least one subsequent operation according to the second single command, wherein the second single command represents a second duplicate command, for duplicating from a second source logical address to a second destination logical address, and the at least one subsequent operation comprises:

in response to logical-to-physical (L2P) mapping information of the second source logical address in a first L2P address mapping table being null, controlling the memory device to make any data at the second destination logical address be invalid data.

2. The method of claim 1, wherein the NV memory represents a Flash memory; and the series of operations further comprise:

updating L2P mapping information of the first destination logical address in the first L2P address mapping table.

3. The method of claim 1, wherein the NV memory represents a three-dimensional (3D) cross point (XPoint) memory.

4. The method of claim 1, wherein the first duplicate command is applicable to single range duplication; and regarding the single range duplication, multiple operations associated with the first duplicate command comprise:

the host device inserts the first duplicate command into a submission queue (SQ) within the host device;

the host device writes a first doorbell within the memory device, for signaling the first duplicate command as a new command;

the memory device fetches the first duplicate command from the SQ within the host device;

the memory device processes the first duplicate command, having no need to access a buffer within the host device;

the memory device pushes completion information of the first duplicate command to a completion queue (CQ) within the host device;

the memory device sends an interrupt for signaling that the first duplicate command is completed;

the host device gets the completion information of the first duplicate command from the CQ within the host device; and the host device writes a second doorbell within the memory device to release a CQ entry corresponding to the first duplicate command in the CQ.

5. The method of claim 1, wherein the first duplicate command is applicable to multi-range duplication; and regarding the multi-range duplication, multiple operations associated with the first duplicate command comprise:

the host device inserts the first duplicate command into a submission queue (SQ) within the host device;

the host device writes a first doorbell within the memory device, for signaling the first duplicate command as a new command;

the memory device fetches the first duplicate command from the SQ within the host device;

the memory device gets duplicate range information from a buffer within the host device, and then processes the first duplicate command, wherein the duplicate range information comprises source address range information indicating multiple source address ranges of the multi-range duplication and destination address range information indicating multiple destination address ranges of the multi-range duplication, and the first source logical address and the first destination logical address represent a source logical address of any source address range of the multiple source address ranges and a destination logical address of any destination address range of the multiple destination address ranges, respectively;

the memory device pushes completion information of the first duplicate command to a completion queue (CQ) within the host device;

the memory device sends an interrupt for signaling that the first duplicate command is completed;

the host device gets the completion information of the first duplicate command from the CQ within the host device; and the host device writes a second doorbell within the memory device to release a CQ entry corresponding to the first duplicate command in the CQ.

6. The method of claim 1, wherein in response to the first duplicate command, the memory controller is capable of copying the first data from at least one source logical address comprising the first source logical address to at least one destination address comprising the first destination logical address within the memory device, having no need to perform data transfer of the first data between the host device and the memory device.

7. A memory controller of a memory device, the memory device comprising the memory controller and a non-volatile (NV) memory, the NV memory comprising at least one NV memory element, the memory controller comprising:

a processing circuit, arranged to control the memory controller according to a plurality of host commands from a host device, to allow the host device to access the NV memory through the memory controller, wherein the processing circuit is arranged to perform data access control of the memory device with aid of a predetermined command; and a transmission interface circuit, arranged to perform communications with the host device;

wherein:

the memory controller receives a first single command from the host device through the transmission interface circuit of the memory controller;

in response to the first single command conforming to a predetermined format of the predetermined command, the memory controller performs a series of operations according to the first single command, wherein the first single command represents a first duplicate command, for duplicating first data from a first source logical address to a first destination logical address, and the series of operations comprise:

reading the first data at the first source logical address by reading the first data at a first source physical address, wherein the first source physical address is associated with the first source logical address; and writing the first data at the first destination logical address by writing the first data at a first destination physical address, wherein the first destination physical address is associated with the first destination logical address, the memory controller receives a second single command from the host device through the transmission interface circuit of the memory controller; and in response to the second single command conforming to the predetermined format of the predetermined command, the memory controller performs at least one subsequent operation according to the second single command, wherein the second single command represents a second duplicate command, for duplicating from a second source logical address to a second destination logical address, and the at least one subsequent operation comprises:

in response to logical-to-physical (L2P) mapping information of the second source logical address in a first L2P address mapping table being null, controlling the memory device to make any data at the second destination logical address be invalid data.

8. The memory device comprising the memory controller of claim 7, wherein the memory device comprises:
the NV memory, configured to store information; and
the memory controller, coupled to the NV memory, configured to control operations of the memory device.

9. An electronic device comprising the memory device of claim 8, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

10. A method for performing data access control of a memory device with aid of a predetermined command, the method being applied to a host device coupled to the memory device, the memory device comprising a memory controller and a non-volatile (NV) memory, the NV memory comprising at least one NV memory element, the method comprising:
sending a first single command, the first single command conforming to a predetermined format of the predetermined command, from the host device to the memory controller through a transmission interface circuit of the host device, to trigger the memory controller to perform a series of operations according to the first single command, wherein the first single command represents a first duplicate command, for duplicating first data from a first source logical address to a first destination logical address, and the series of operations comprise:

reading the first data at the first source logical address by reading the first data at a first source physical address, wherein the first source physical address is associated with the first source logical address; and writing the first data at the first destination logical address by writing the first data at a first destination physical address, wherein the first destination physical address is associated with the first destination logical address; and sending a second single command, the second single command conforming to the predetermined format of the predetermined command, from the host device to the memory controller through the transmission interface circuit of the host device, to trigger the memory controller to perform at least one subsequent operation according to the second single command, wherein the second single command represents a second duplicate command, for duplicating from a second source logical address to a second destination logical address, and the at least one subsequent operation comprises:

in response to logical-to-physical (L2P) mapping information of the second source logical address in a first L2P address mapping table being null, controlling the memory device to make any data at the second destination logical address be invalid data.

11. The method of claim 10, wherein the NV memory represents a Flash memory; and the series of operations further comprise:
updating L2P mapping information of the first destination logical address in the first L2P address mapping table.

12. The method of claim 10, wherein the NV memory represents a three-dimensional (3D) cross point (XPoint) memory.

13. The method of claim 10, wherein the first duplicate command is applicable to single range duplication; and regarding the single range duplication, multiple operations associated with the first duplicate command comprise:
the host device inserts the first duplicate command into a submission queue (SQ) within the host device;
the host device writes a first doorbell within the memory device, for signaling the first duplicate command as a new command;
the memory device fetches the first duplicate command from the SQ within the host device;
the memory device processes the first duplicate command, having no need to access a buffer within the host device;
the memory device pushes completion information of the first duplicate command to a completion queue (CQ) within the host device;
the memory device sends an interrupt for signaling that the first duplicate command is completed;
the host device gets the completion information of the first duplicate command from the CQ within the host device; and
the host device writes a second doorbell within the memory device to release a CQ entry corresponding to the first duplicate command in the CQ.

14. The method of claim 10, wherein the first duplicate command is applicable to multi-range duplication; and regarding the multi-range duplication, multiple operations associated with the first duplicate command comprise:
the host device inserts the first duplicate command into a submission queue (SQ) within the host device;

the host device writes a first doorbell within the memory device, for signaling the first duplicate command as a new command;

the memory device fetches the first duplicate command from the SQ within the host device;

the memory device gets duplicate range information from a buffer within the host device, and then processes the first duplicate command, wherein the duplicate range information comprises source address range information indicating multiple source address ranges of the multi-range duplication and destination address range information indicating multiple destination address ranges of the multi-range duplication, and the first source logical address and the first destination logical address represent a source logical address of any source address range of the multiple source address ranges and a destination logical address of any destination address range of the multiple destination address ranges, respectively;

the memory device pushes completion information of the first duplicate command to a completion queue (CQ) within the host device;

the memory device sends an interrupt for signaling that the first duplicate command is completed;

the host device gets the completion information of the first duplicate command from the CQ within the host device; and the host device writes a second doorbell within the memory device to release a CQ entry corresponding to the first duplicate command in the CQ.

15. The method of claim 10, wherein in response to the first duplicate command, the memory controller is capable of copying the first data from at least one source logical address comprising the first source logical address to at least one destination address comprising the first destination logical address within the memory device, having no need to perform data transfer of the first data between the host device and the memory device.

16. The host device that operates according to the method of claim 10.

* * * * *